US012138207B2

(12) United States Patent
Johnson

(10) Patent No.: US 12,138,207 B2
(45) Date of Patent: Nov. 12, 2024

(54) ERGONOMIC SUPPORT DEVICE

(71) Applicant: Joseph G. Johnson, Emmett, ID (US)

(72) Inventor: Joseph G. Johnson, Emmett, ID (US)

( * ) Notice: Subject to any disclaimer, the term of this patent is extended or adjusted under 35 U.S.C. 154(b) by 161 days.

(21) Appl. No.: 17/881,849

(22) Filed: Aug. 5, 2022

(65) Prior Publication Data

US 2022/0370280 A1 Nov. 24, 2022

Related U.S. Application Data

(63) Continuation of application No. 16/555,826, filed on Aug. 29, 2019, now Pat. No. 11,439,563.

(60) Provisional application No. 62/724,394, filed on Aug. 29, 2018.

(51) Int. Cl.
*A61H 1/02* (2006.01)

(52) U.S. Cl.
CPC .......... *A61H 1/024* (2013.01); *A61H 1/0277* (2013.01); *A61H 1/0281* (2013.01); *A61H 2201/1614* (2013.01); *A61H 2201/164* (2013.01); *A61H 2201/165* (2013.01); *A61H 2205/081* (2013.01)

(58) Field of Classification Search
CPC .... A61H 1/024; A61H 1/0277; A61H 1/0281; A61H 2201/1614; A61H 2201/164; A61H 2201/165; A61H 2205/081; A63B 2244/09
See application file for complete search history.

(56) References Cited

U.S. PATENT DOCUMENTS

| | | | |
|---|---|---|---|
| 807,908 A | 12/1905 | Bradstreet | |
| 5,075,902 A | 12/1991 | McReynolds et al. | |
| 5,201,074 A | 4/1993 | Dicker | |
| 5,357,637 A | 10/1994 | Moore | |
| 5,465,428 A | 11/1995 | Earl | |
| 5,490,826 A | 2/1996 | Rose | |
| 5,737,773 A | 4/1998 | Dicker et al. | |
| 5,745,917 A | 5/1998 | Dicker et al. | |
| 5,842,959 A | 12/1998 | Wilkinson | |
| 6,129,691 A * | 10/2000 | Ruppert | A61F 5/026 128/845 |
| 6,684,410 B2 | 2/2004 | Robinett et al. | |
| 6,837,834 B2 * | 1/2005 | Basting | A63B 21/0552 482/121 |
| 7,476,185 B2 | 1/2009 | Drennan | |
| 8,910,317 B2 | 12/2014 | Decker | |
| 9,009,863 B2 | 4/2015 | Decker | |
| 9,192,806 B2 | 11/2015 | Mial | |
| 9,629,405 B2 | 4/2017 | Cornish | |

(Continued)

OTHER PUBLICATIONS

Examiner Interview Summary Record (PTOL-413) received for U.S. Appl. No. 16/555,826, mailed on Jun. 16, 2022, 1 pages.

(Continued)

*Primary Examiner* — Timothy A Stanis
(74) *Attorney, Agent, or Firm* — Workman Nydegger

(57) ABSTRACT

A support device comprises a first band secured to a second band in a cross pattern. A proximal end of the first band and a proximal end of the second band can also be configured to fasten around a waist of a user. Further, a distal end of the first band can be configured to fasten around a first leg of the user, and a distal end of the second band can be configured to fasten around a second leg of the user. The support device may prevent improper and dangerous misalignment of the back, hips and knees while squatting.

20 Claims, 8 Drawing Sheets

(56) References Cited

U.S. PATENT DOCUMENTS

| | | | | |
|---|---|---|---|---|
| 10,842,204 | B2 | 11/2020 | Stricker | |
| 2005/0197607 | A1* | 9/2005 | Brown | A61N 1/0484 602/19 |
| 2012/0329617 | A1 | 12/2012 | Tal et al. | |
| 2015/0196789 | A1* | 7/2015 | Whitt | A63B 21/00072 482/124 |
| 2018/0333604 | A1* | 11/2018 | Thompson | A63B 21/00181 |
| 2019/0239579 | A1* | 8/2019 | Stricker | A63B 23/0482 |
| 2019/0262161 | A1 | 8/2019 | Massimiani | |
| 2020/0069502 | A1 | 3/2020 | Johnson | |

OTHER PUBLICATIONS

Final Office Action received for U.S. Appl. No. 16/555,826, mailed on Apr. 11, 2022, 20 pages.
Non-Final Office Action received for U.S. Appl. No. 16/555,826, mailed on Sep. 28, 2021, 17 pages.
Notice of Allowance received for U.S. Appl. No. 16/555,826, mailed on Jun. 16, 2022, 8 pages.
StandStrong Flex. Stand Strong Company [online]. Stand Strong Co., 2018 [retrieved Aug. 29, 2019]. Retrieved from Internet: <URL: https://www.standstrongcompany.com/product-page/standstrong-flex>.

* cited by examiner

ERGONOMIC SUPPORT DEVICE

CROSS-REFERENCE TO RELATED APPLICATIONS

This application claims priority to and the benefit of U.S. patent application Ser. No. 16/555,826, filed Aug. 29, 2019, entitled "Ergonomic Support Device" which claims priority to Provisional Patent Application No. 62/724,394, filed on Aug. 29, 2018, entitled "Supportive Athletic Wear to Encourage Proper Form," both of which are incorporated by reference in their entirety herein.

BACKGROUND

1. The Field of the Invention

The present disclosure relates generally to systems, methods, and apparatus for providing a user ergonomic support.

2. Background and Relevant Art

In many occupations, employees are required to repeatedly squat and lift heavy loads. For example, warehouse staff, construction workers, pipefitters, freight workers, and professional movers can spend hours a day alternating between squatting and standing positions. Weightlifters perform a similar action—repeated squatting while lifting heavy weights. Unless the employees of such occupations and weightlifters maintain proper form while squatting and lifting, they risk severe injury to their backs, including muscle and ligament strains, and herniated discs.

Traditional safety and weightlifting back belts can help reduce the risk of back injuries by increasing intra-abdominal pressures, reminding lifters to maintain proper form, and restricting range of motion. However, back belts may also give lifters a false sense of security leading them to lift more weight than they would without the back belts. Further, back belts only target the back, while squatting engages the lifter's hips, leg muscles, and knees.

Accordingly, a need in the art exists.

BRIEF SUMMARY

Implementations of the present invention solve one or more problems in the art with systems, methods, and apparatus configured to provide ergonomic support. More specifically, in at least one implementation of the present invention, a support device comprises a first band secured to a second band in a cross pattern. A proximal end of the first band and a proximal end of the second band can also be configured to fasten around a waist of a user. Further, a distal end of the first band can be configured to fasten around a first leg of the user, and a distal end of the second band can be configured to fasten around a second leg of the user.

Additionally, in at least one implementation, a support device includes a waist band configured to fasten around a waist of a user. The support device can also comprise a proximal end of a first lower band and a proximal end of a second lower band that are secured to the waist band. The first lower band and the second lower band can be also secured together in a cross pattern. Also, a distal end of the first lower band can be configured to fasten around a first leg of the user, and a distal end of the second lower band can be configured to fasten around a second leg of the user. The support device can further include a proximal end of a first upper band and a proximal end of a second upper band that are secured to the waist band. The first upper band and the second lower band can be secured together in a cross pattern. A distal end of the first upper band can be configured to fasten around a first arm of the user and a distal end of the second upper band can be configured to fasten around a second arm of the user.

Further, in at least one implementation, a support device comprises a first band secured to a second band in a cross pattern. A proximal end of the first band and a proximal end of the second band can also be configured to fasten around a waist of a user. Further, a distal end of the first band can be configured to fasten around a first arm of the user, and a distal end of the second band can be configured to fasten around a second arm of the user.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention solve one or more problems in the art with systems, methods, and apparatus configured to provide ergonomic support. More specifically, in at least one implementation of the present invention, a support device comprises a first band secured to a second band in a cross pattern. A proximal end of the first band and a proximal end of the second band can also be configured to fasten around a waist of a user. Further, a distal end of the first band can be configured to fasten around a first leg of the user, and a distal end of the second band can be configured to fasten around a second leg of the user.

In at least one implementation of the present invention, the support device can prevent improper and dangerous misalignment of the back, hips and knees while squatting. The support device can aid in the user's ergonomically correct positioning while performing ordinary lifting motions. Like traditional lifting belts, the waist band of the support device can enhance intra-abdominal pressure in the user, which can move stress away from the user's spine. Compression of the waist can also encourage the user to keep their chest up.

The support band, unlike traditional lifting belts, can include bands that wrap around the user's knees. As the user squats, the crossed bands can stretch across the back of the user causing the knees to be pulled slightly out, thus preventing them from caving inward. The bands wrapped around the knees of the user can prevent injury or provide needed support for those who have suffered knee injuries in the past.

Figure 1A:
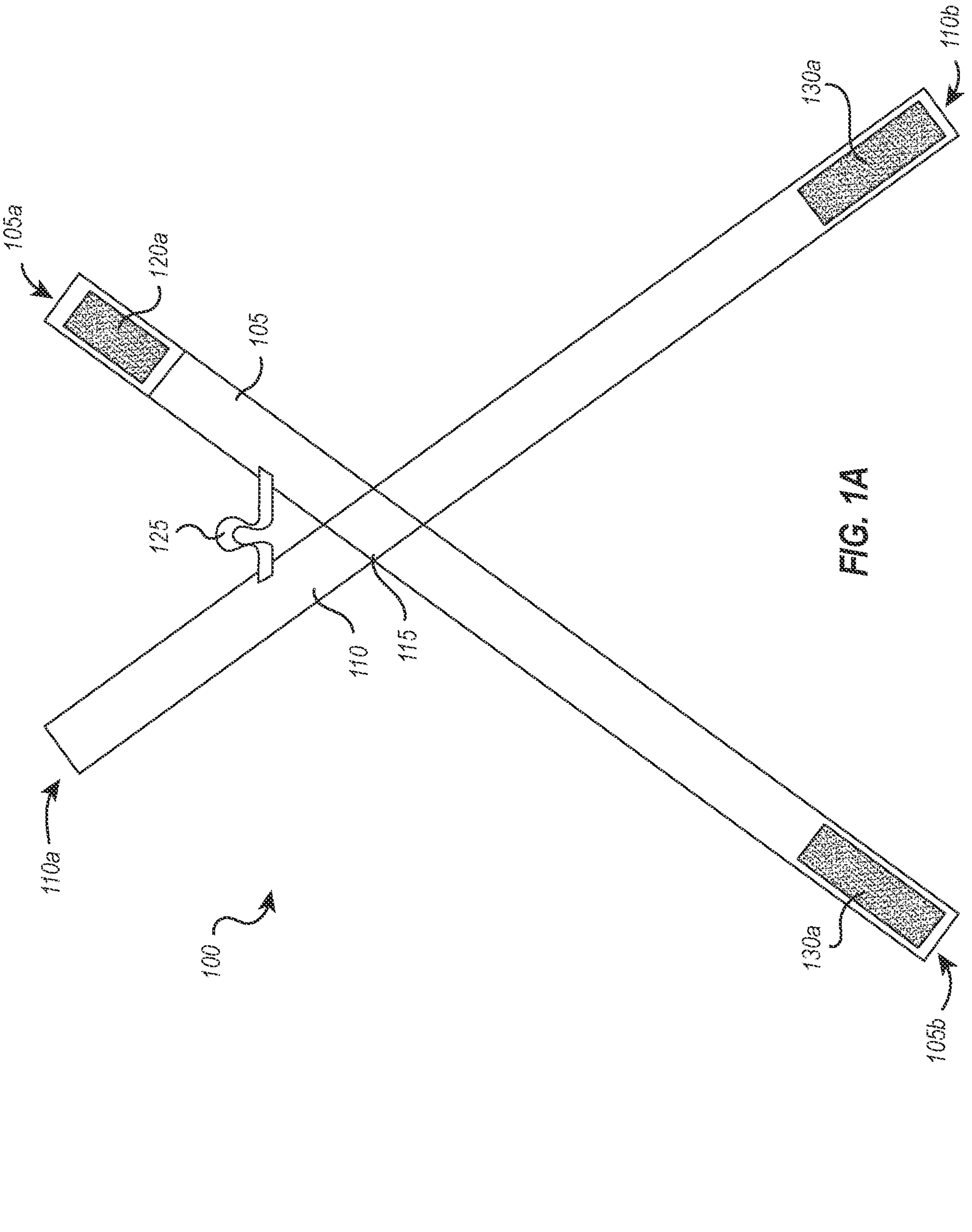
FIG. 1A illustrates a front view of an exemplary ergonomic support device.
Figure 1B:
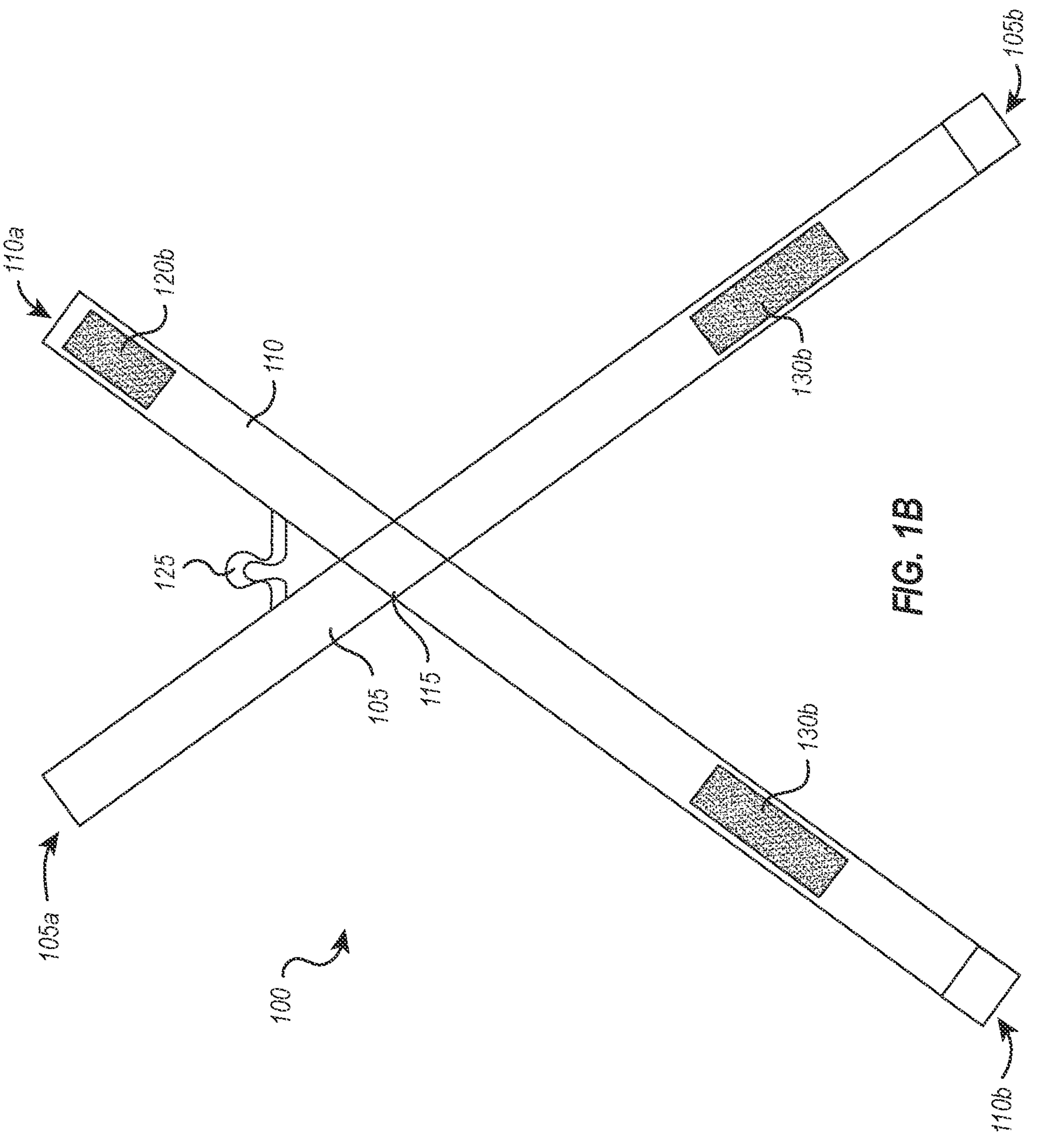
FIG. 1B illustrates a back view of the exemplary ergonomic support device shown in FIG. 1A.

Turning now to the figures, FIGS. 1A and 1B show a front view and a back view, respectively, of at least one implementation of the support device 100. As shown in FIGS. 1A and 1B, the support device 100 comprises a first band 105 and a second band 110 that are arranged in a cross pattern such that the first and second band 105 and 110 intersect at a point 115. Both the first and second band 105 and 110 include a proximal end 105*a* and 110*a*, respectively, and a distal end 105*b* and 110*b*, respectively.

The proximal end of the first band 105*a* and the proximal end of the second band 110*a* are configured to wrap around the user's waist and be secured together. In at least one implementation, the proximal end of the first band 105*a* and the proximal end of the second band 110*a* are secured at a front position around the user's waist. The proximal end of the first band 105*a* and the proximal end of the second band 110*a* may be secured using any fastener, including a hook, a snap, a hook and loop fastener, etc. For example, FIG. 1A shows a first proximal hook and loop fastener 120*a* attached to the proximal end of the first band 105*a* that can be secured to a second proximal hook and loop fastener 120*b* attached to the proximal end of the second band 110*a* (shown in FIG. 1B).

As shown in FIGS. 1A and 1B, a horizontal waist band 125 stretches between the proximal end of the first band 105*a* and the proximal end of the second band 110*a* before the first and second bands 105 and 110 cross at the point 115.

The distal end of the first band 105*b* is configured to wrap around a first knee of the user, and the distal end of the second band 110*b* is configured to wrap around a second knee of the user. The distal end of the first band 105*b* and the distal end of the second band 110*b* may be secured around the first and the second knee, respectively, using any fastener, including a hook, a snap, a hook and loop fastener, etc. For example, FIG. 1A shows two first distal hook and loop fasteners 130*a*—one attached to the distal end of the first band 105*b* and one attached to the distal end of the second band 110*b*. The first distal hook and loop fasteners 130*a* can be secured to two second distal hook and loop fasteners 130*b* (shown in FIG. 1B) around the user's knees.

Figure 2A:
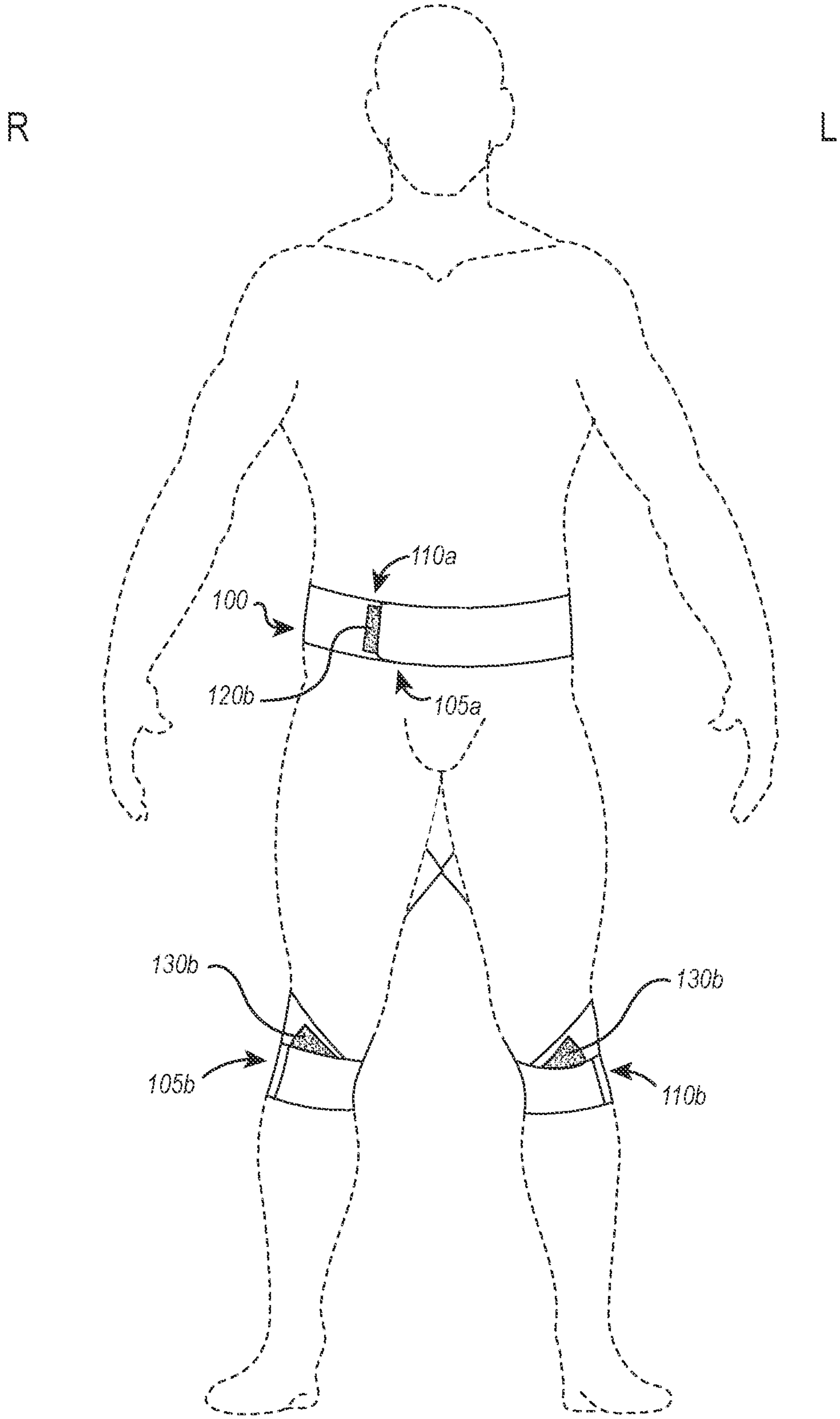
FIG. 2A illustrates a front view of the exemplary ergonomic support device shown in FIGS. 1A-1B being worn.
Figure 2B:
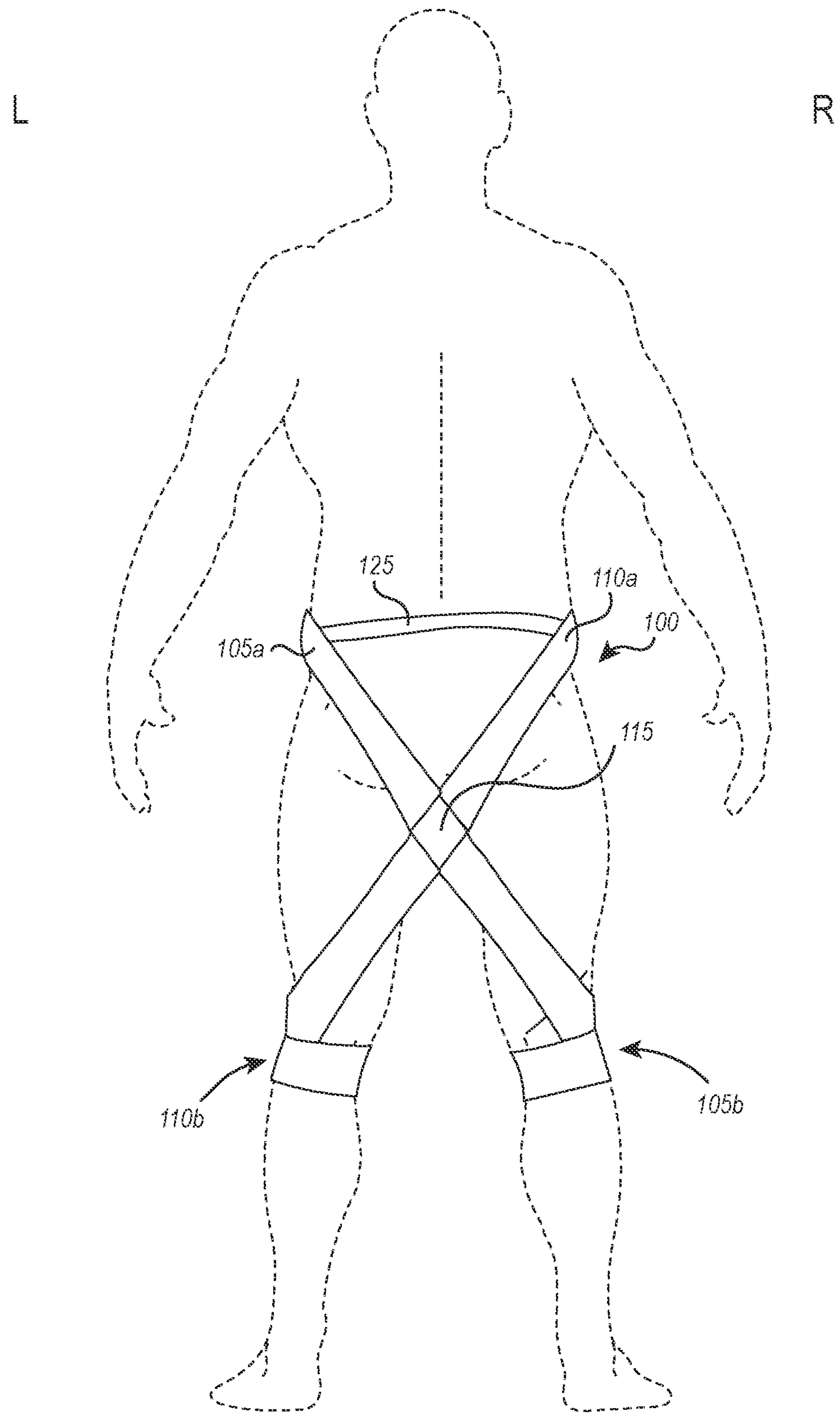
FIG. 2B illustrates a back view of the exemplary ergonomic support device shown in FIGS. 1A-2A being worn.

FIGS. 2A and 2B illustrates a front view and a back view, respectively, of the exemplary support device 100 shown in FIGS. 1A-1B worn on a body. FIG. 2A shows the proximal end of the first band 105*a* and the proximal end of the second band 110*a* secured at a front position around the user's waist. A portion of the second proximal hook and loop fastener 120*b* attached to the proximal end of the second band 110*a* is also shown in FIG. 2A.

As shown in FIG. 2B, the horizontal waist band 125 can provide additional support around the user's waist. Although the horizontal waist band 125 is shown having a smaller width than the first and second bands 105 and 110, the present invention is not so limited. In at least one implementation, the support device does not include a horizontal waist band 125.

FIG. 2B shows the proximal end of the first band 105*a* extending from the left side of the user's waist, intersecting with the second band at the point 115, and distal end of the first band 105*b* extending toward the user's right knee. Similarly, FIG. 2B shows the proximal end of the second band 110*a* extending from the right side of the user's waist, intersecting with the first band at the point 115, and distal end of the second band 110*b* extending toward the user's left knee. Both FIGS. 2A and 2B show how the distal ends of the first and second bands 105*b* and 110*b* wrap around the user's right and left knees, respectively. The two second distal hook and loop fasteners 130*b* are also shown in FIG. 2A, and can attach to the two first distal hook and loop fasteners 130*a* (not shown) to secure the distal ends of the first and second bands 105*b* and 110*b* around the user's knees.

Figure 3A:
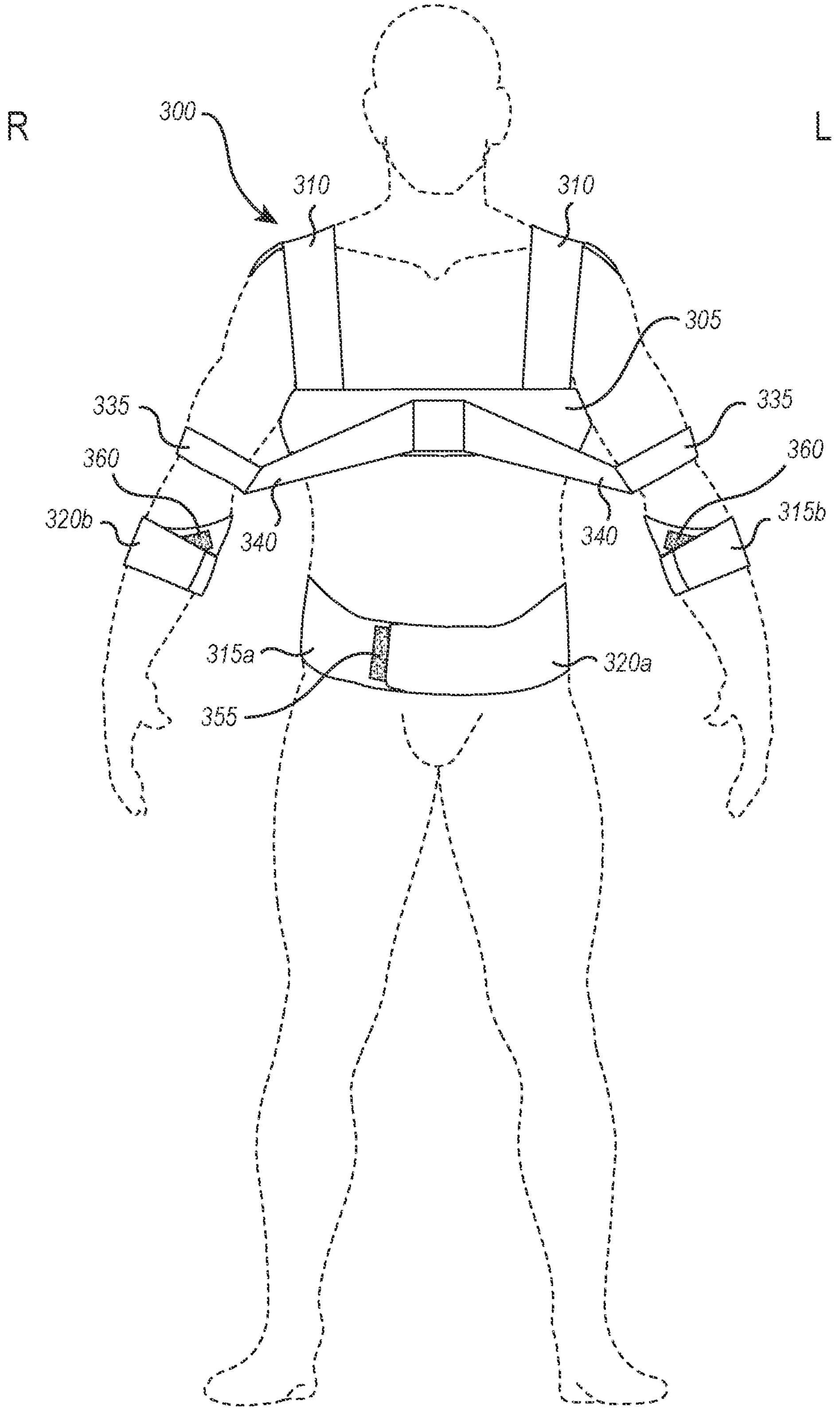
FIG. 3A illustrates a front view of an alternative exemplary ergonomic support device being worn.
Figure 3B:
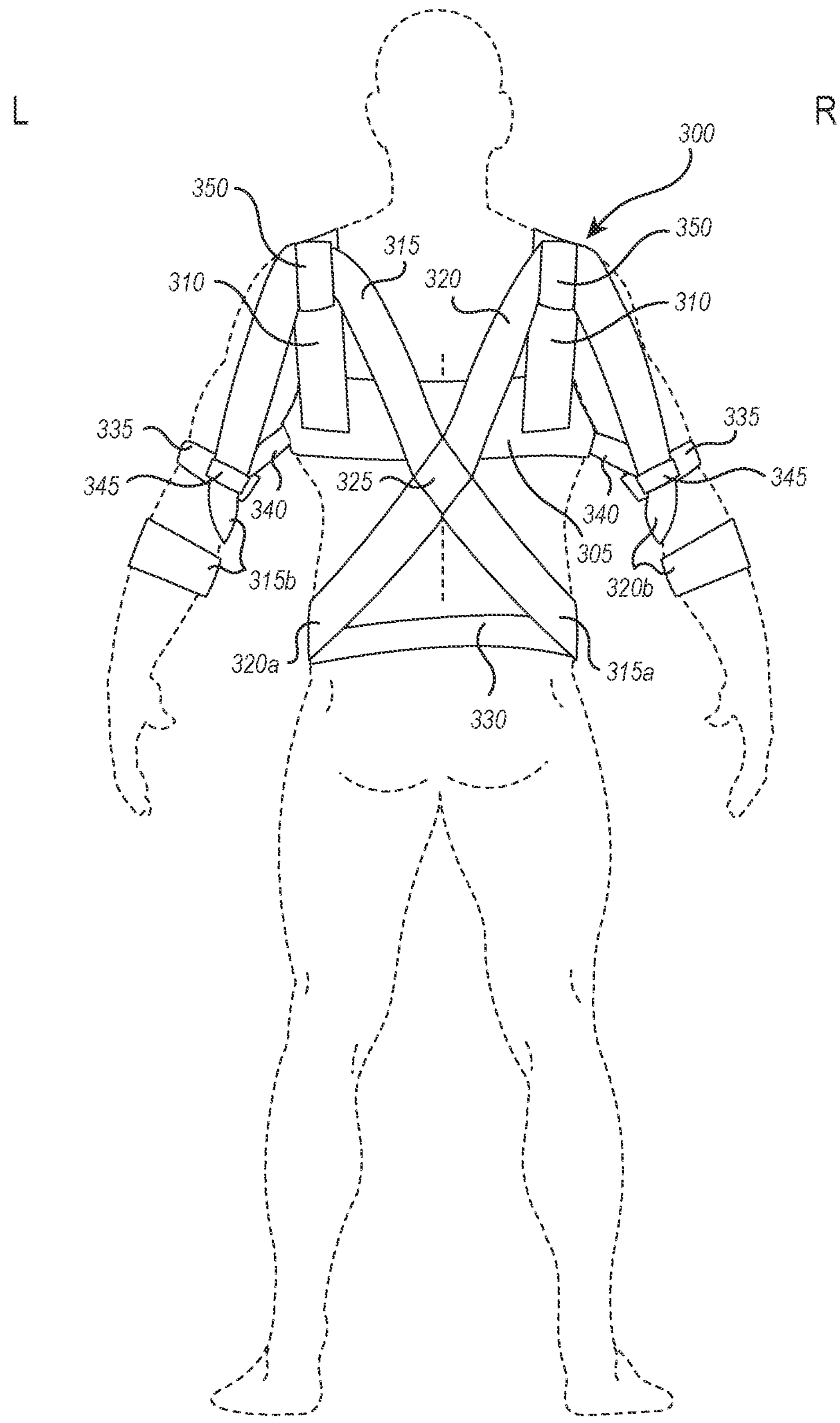
FIG. 3B illustrates a back view of the alternative exemplary ergonomic support device shown in FIG. 3A being worn.

FIGS. 3A and 3B illustrate an alternative support device 300 worn on the body of the user. The alternative support device 300, like the support device 100 shown in FIGS. 1A-2B can protect the user from unnecessary strain while lifting. As shown in FIGS. 3A and 3B, the alternative support device 300 includes a chest band 305 and two shoulder straps 310.

FIGS. 3A and 3B also show that the alternative support device 300 includes a first and second band 315 and 320 that are arranged in a cross pattern such that the first and second band 315 and 320 intersect at a point 325. Both the first and second band 315 and 320 include a proximal end 315*a* and 320*a*, respectively, and a distal end 315*b* and 320*b*, respectively.

The proximal end of the first band 315*a* and the proximal end of the second band 320*a* are configured to wrap around the user's waist and be secured together. In at least one implementation, the proximal end of the first band 315*a* and the proximal end of the second band 320*a* are secured at a front position around the user's waist. The proximal end of the first band 315*a* and the proximal end of the second band 320*a* may be secured using any fastener, including a hook, a snap, a hook and loop fastener, etc. For example, a proximal hook and loop fastener 355 is shown in FIG. 3A attached to the proximal end of the first band 315*a*. Although not shown, a corresponding proximal hook and loop fastener may be on the proximal end of the second band 320*a*.

As shown in FIG. 3B, a horizontal waist band 330 stretches between the proximal end of the first band 315*a* and the proximal end of the second band 320*a* before the first and second bands 315 and 320 cross at the point 325. Like the horizontal waist band 125 shown in FIGS. 1A-1B, and 2B, the horizontal waist band 330 can provide additional support around the user's waist. Although the horizontal waist band 330 is shown having a smaller width than the first and second bands 315 and 320, the present invention is not so limited. In at least one implementation, the support device does not include a horizontal waist band 330.

As shown in FIG. 3B, after the first and second bands 315 and 320 intersect at the point 325, the first and second bands 315 and 320 each run through a shoulder strap loop 350 located on the posterior side of each of the shoulder straps 310. More specifically, the proximal end of the first band 315*a* extends from the right side of the user's waist, intersects with the second band 320 at the point 325, and continues to extend through the shoulder strap loop 350 of shoulder strap 310 on the left shoulder of the user. Similarly, the proximal end of the second band 320*a* extends from the left side of the user's waist, intersects with the first band 315 at the point 325, and continues to extend through the shoulder strap loop 350 of shoulder strap 310 on the right shoulder of the user.

At elbow straps 335, the first and second bands 315 and 320 may be reinforced by chest straps 340 that extend from the anterior side of the chest band 305 to the posterior side of the elbow straps 335. The elbow straps 335 may include elbow strap loops 345 to secure the first and second bands 315 and 320.

As shown in FIGS. 3A and 3B, the distal end of the first band 315*b* is configured to wrap around the user's left arm, and the distal end of the second band 320*b* is configured to wrap around the user's right arm. The distal end of the first band 315*b* and the distal end of the second band 320*b* may be secured around the first and the second arm, respectively, using any fastener, including a hook, a snap, a hook and loop fastener, etc. For example, a distal hook and loop fasteners 360 are shown in FIG. 3A on the distal ends of the first and second bands 315*b* and 320*b*. The distal hook and loop fasteners 360 shown in FIG. 3A may be configured to attach to corresponding distal hook and loop fasteners (not shown) nearer the distal end and on the opposite side of the distal ends of the first and second bands 315*b* and 320*b*.

Figure 4A:
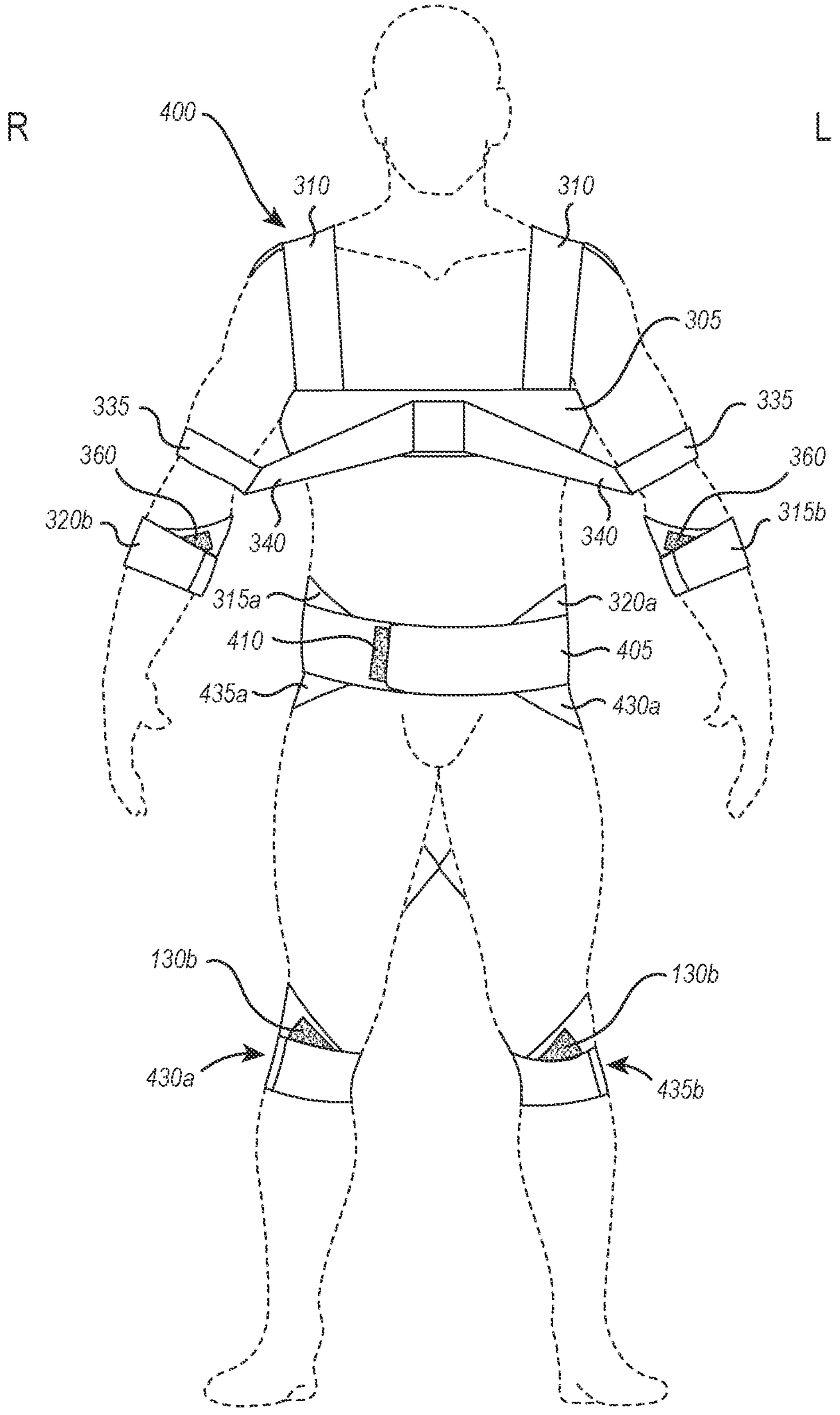
FIG. 4A illustrates a front view of yet another alternative exemplary ergonomic support device being worn.
Figure 4B:
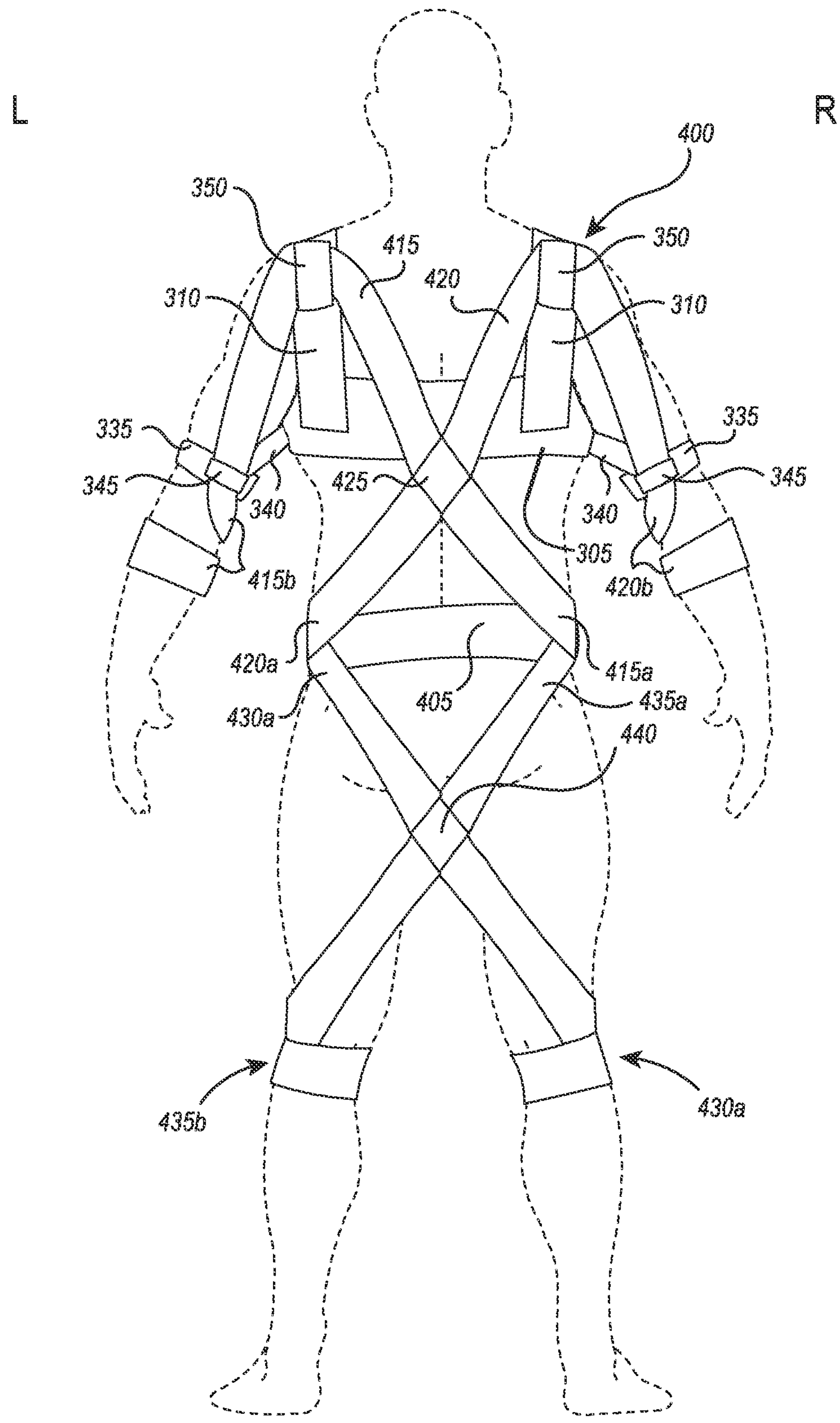
FIG. 4B illustrates a back view of the alternative exemplary ergonomic support device shown in FIG. 4A being worn.

FIGS. 4A and 4B illustrate yet another alternative support device 400 worn on the body of the user that can protect the user from unnecessary strain while lifting. The alternative support device 400 is similar to both the support device 100 shown in FIGS. 1A-2B and the alternative support device 300 shown in FIGS. 3A-3B.

As shown in FIGS. 4A and 4B, the alternative support device 400 includes a waist band 405 that is a secured at a front position around the user's waist. The waist band 405 may be secured using any fastener, including a hook, a snap, a hook and loop fastener, etc. For example, a proximal hook and loop fastener 410 is shown in FIG. 4A attached to the waistband 405. The proximal hook and loop fastener 410 may be configured to attach to a corresponding proximal hook and loop fastener (not shown) on the opposite side of the waistband 405 to secure the waistband 405 around the user's waist.

FIGS. 4A and 4B show that the alternative support device can include a first upper band 415 and a second upper band 420, which each include a proximal end 415*a* and 420*a*, respectively, and a distal end 415*b* and 420*b*, respectively. The alternative support device 300 can also include a chest band 305 with two attached shoulder straps 310, each with a shoulder strap loop 350 located on the posterior side of the shoulder straps 310.

In FIG. 4B, the proximal end of the first upper band 315*a* is shown extending from the right side of the user's waist, intersecting with the second upper band 420 at an upper point 425, and continuing to extend through the shoulder strap loop 350 of the shoulder strap 310 on the left shoulder of the user. Similarly, the proximal end of the second upper band 420*a* is shown extending from the left side of the user's waist, intersecting with the first upper band 415 at the upper point 425, and continuing to extend through the shoulder strap loop 350 of the shoulder strap 310 on the right shoulder of the user.

At elbow straps 335, the first and second upper bands 415 and 420 may be reinforced by chest straps 340 that extend from the anterior side of the chest band 305 to the posterior side of the elbow straps 335. The elbow straps 335 may include elbow strap loops 345 to secure the first and second bands 415 and 420.

As shown in FIGS. 4A and 4B, the distal end of the first upper band 415*b* is configured to wrap around the user's left arm, and the distal end of the second upper band 420*b* is configured to wrap around the user's right arm. The distal end of the first upper band 415*b* and the distal end of the second upper band 420*b* may be secured around the first and the second arm, respectively, using any fastener, including a hook, a snap, a hook and loop fastener, etc. For example, a distal hook and loop fasteners 360 are shown in FIG. 4A on the distal ends of the first and second bands 415*b* and 420*b*. The distal hook and loop fasteners 360 shown in FIG. 4A may be configured to attach to corresponding distal hook and loop fasteners (not shown) nearer the distal end and on the opposite side of the distal ends of the first and second upper bands 415*b* and 420*b*.

The alternative support device 400 can include a first lower band 430 and a second lower band 435, which each include a proximal end 430*a* and 435*a*, respectively, and a distal end 430*b* and 435*b*, respectively. FIGS. 4A and 4B show the proximal end of the first lower band 430*a* extending from the left side of the user's waist, intersecting with the second lower band 435 at a lower point 440, and distal end of the first lower band 430*b* extending toward the user's right knee. Similarly, FIGS. 4A and 4B show the proximal end of the second lower band 435*a* extending from the right side of the user's waist, intersecting with the first lower band 430 at the lower point 440, and distal end of the second band 435*b* extending toward the user's left knee. The distal ends of the first and second bands 430*b* and 435*b* can also wrap around the user's right and left knees, respectively. Two second distal hook and loop fasteners 130*b* are also shown in FIG. 4A, which can attach to two first distal hook and loop fasteners 130*a* (not shown) to secure the distal ends of the first and second lower bands 430*b* and 435*b* around the user's knees.

The proximal ends of the first and second upper bands 415*a* and 420*a* and the proximal ends of the first and second lower bands 430*a* and 435*a* may be adjustably secured to the waistband so the user may further adjust the fit of the alternative support device 400.

In at least one implementation of the present invention, the support device 100 or the alternative support devices 300 and 400 are composed of a durable spandex, polyester, or nylon compression material, or a combination thereof.

One skilled in the art will appreciate that FIGS. 2A-4B are merely exemplary the present invention is not limited a specific positioning of the support device 100 and alternative support devices 300 and 400 on the user's body. The positioning of the support device 100 and alternative support devices 300 and 400 will vary depending on the user's body and preferences.

In at least one implementation of the present invention, the support device 100, or the alternative support device 300 or 400 is worn on a body robot. The support device 100, or the alternative support device 300 or 400 may increase the strength and lifting ability of the body robot as well as protect it from potential damage during lifting.

Additional features may also be included to the support device 100 or alternative support devices 300 or 400. For example, a durable latex or polymer coating can be added to the distal ends of the first and second bands 105*b* and 110*b* or the distal ends of the first and second lower bands 430*a* and 435*a* to serve as knee pads for manual laborers or gardeners. In at least one implementation, the support device 100 or alternative support devices 300 or 400 include reflective fabric. The addition of reflective fabric may further increase the safety of manual laborers wearing the support device 100 or alternative support device 300 or 400, especially is low-light conditions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A support device comprising:

a first band having a first end, a second end, and a first length disposed between the first end and the second end;

a second band having a third end, a fourth end, and a second length disposed between the third end and the fourth end, wherein:

the first band and the second band are diagonally coupled to one another, the second end of the first band is configured to fasten around a first leg of a user, the fourth end of the second band is configured to fasten around a second leg of the user, the first length of the first band is configured to exert a first force upon an outside lateral part of the user's first leg, the first force being in a direction away from the user's second leg, and the second length of the second band is configured to exert a second force upon an outside lateral part of the user's second leg, the second force being in a direction away from the user's first leg a first fastener is disposed proximately to the first end of the first band and is disposed on a first flat surface portion of the first band, a second fastener is disposed proximately to the third end of the second band and is disposed on a second flat surface portion of the second band, and a third fastener is disposed proximately to the second end of the first band.

2. The support device of claim 1, wherein:

the first flat surface portion on which the first fastener is disposed faces a first direction, the second flat surface portion on which the second fastener is disposed faces a second direction, the second direction is opposite relative to the first direction, and the second fastener is couplable to the first fastener.

3. The support device of claim 2, wherein the third fastener faces the first direction.

4. The support device of claim 3, wherein a fourth fastener is disposed proximately to the fourth end of the second band and faces the first direction such that the fourth fastener faces oppositely relative to the second fastener, both of which are disposed on the second band.

5. The support device of claim 4, wherein a fifth fastener is disposed on the first length of the first band and faces the second direction.

6. The support device of claim 5, wherein a sixth fastener is disposed on the second length of the second band and faces the second direction.

7. The support device of claim 1, wherein:

a fourth fastener is disposed proximately to the fourth end of the second band.

8. The support device of claim 7, wherein a length of the first fastener is shorter than a length of the third fastener.

9. The support device of claim 7, wherein a length of the second fastener is shorter than a length of the fourth fastener.

10. The support device of claim 7, wherein a length of the first fastener is substantially the same as a length of the second fastener.

11. The support device of claim 7, wherein a length of the third fastener is substantially the same as a length of the fourth fastener.

12. The support device of claim 7, wherein:

a fifth fastener is disposed proximately to the first length of the first band, and a sixth fastener is disposed proximately to the second length of the second band.

13. The support device of claim 12, wherein a length of the fifth fastener is substantially the same as a length of the sixth fastener.

14. A support device comprising:

a first band having a first end, a second end, and a first length disposed between the first end and the second end;

a second band having a third end, a fourth end, and a second length disposed between the third end and the fourth end, wherein:

a first fastener is disposed proximately to the first end of the first band and is disposed on a first flat surface portion of the first band, a second fastener is disposed proximately to the third end of the second band and is disposed on a second flat surface portion of the second band, the first band and the second band are diagonally coupled to one another, the second end of the first band is configured to fasten around a first leg of a user, the fourth end of the second band is configured to fasten around a second leg of the user, the first length of the first band is configured to exert a first force upon an outside lateral part of the user's first leg, the first force being in a direction away from the user's second leg, and the second length of the second band is configured to exert a second force upon an outside lateral part of the user's second leg, the second force being in a direction away from the user's first leg.

15. The support device of claim 14, wherein the first fastener is couplable to the second fastener.

16. The support device of claim 14, wherein the first band and the second band are diagonally coupled to one another at a location that is not a mid-point for either one of the first band or the second band.

17. A support device comprising:

a first band having a first end, a second end, and a first length disposed between the first end and the second end;

a second band having a third end, a fourth end, and a second length disposed between the third end and the fourth end, wherein:

the first band and the second band are diagonally coupled to one another at a location that is not a mid-point for either one of the first band or the second band, the second end of the first band is configured to fasten around a first leg of a user, the fourth end of the second band is configured to fasten around a second leg of the user, the first length of the first band is configured to exert a first force upon an outside lateral part of the user's first leg, the first force being in a direction away from the user's second leg, and the second length of the second band is configured to exert a second force upon an outside lateral part of the user's second leg, the second force being in a direction away from the user's first leg, a first fastener is disposed proximately to the first end of the first band and is disposed on a first flat surface portion of the first band, and a second fastener is disposed proximately to the third end of the second band and is disposed on a second flat surface portion of the second band.

18. The support device of claim 17, wherein a length of the first fastener is substantially the same as a length of the second fastener.

19. The support device of claim 17, wherein the first fastener is a hook and loop fastener.

20. The support device of claim 17, wherein the first fastener is one of: a hook, a snap, or a hook and loop fastener.

* * * * *